(No Model.)

E. WARREN.
VEHICLE TOP.

No. 296,090. Patented Apr. 1, 1884.

WITNESSES:
Fred. G. Dieterich.
J. G. Hinkel.

INVENTOR.
Edward Warren,
by Louis Bagger & Co.
ATTORNEYS

N. PETERS, Photo-Lithographer, Washington, D. C.

UNITED STATES PATENT OFFICE.

EDWARD WARREN, OF LIGONIER, INDIANA.

VEHICLE-TOP.

SPECIFICATION forming part of Letters Patent No. 296,090, dated April 1, 1884.

Application filed November 13, 1882. Renewed August 24, 1883. (No model.)

*To all whom it may concern:*

Be it known that I, EDWARD WARREN, of Ligonier, in the county of Noble and State of Indiana, have invented certain new and useful Improvements in Vehicle-Tops; and I do hereby declare that the following is a full, clear, and exact description of the invention, which will enable others skilled in the art to which it appertains to make and use the same, reference being had to the accompanying drawings, which form a part of this specification, and in which—

Figure 1:
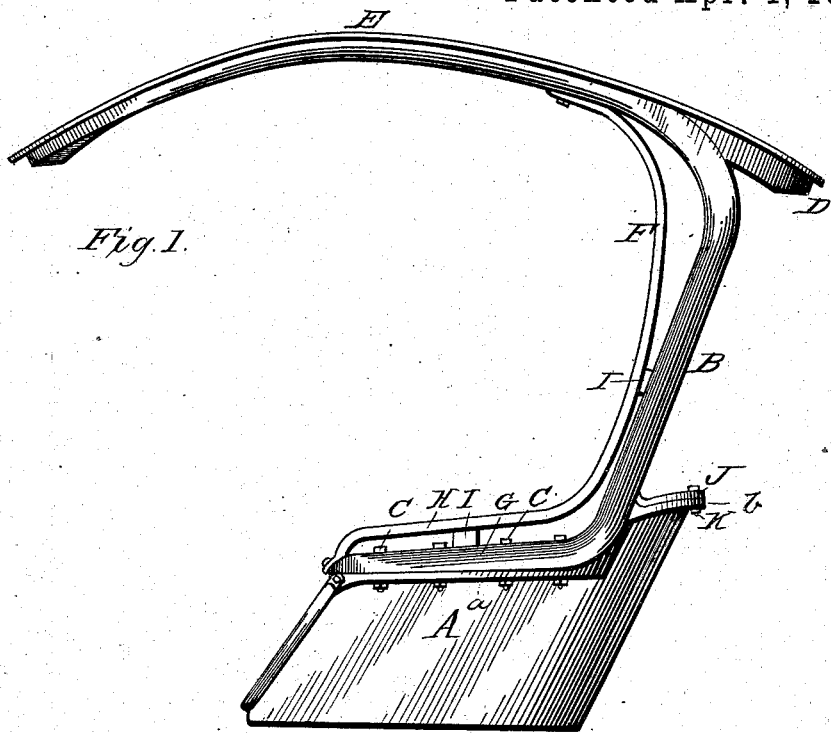
Figure 2:
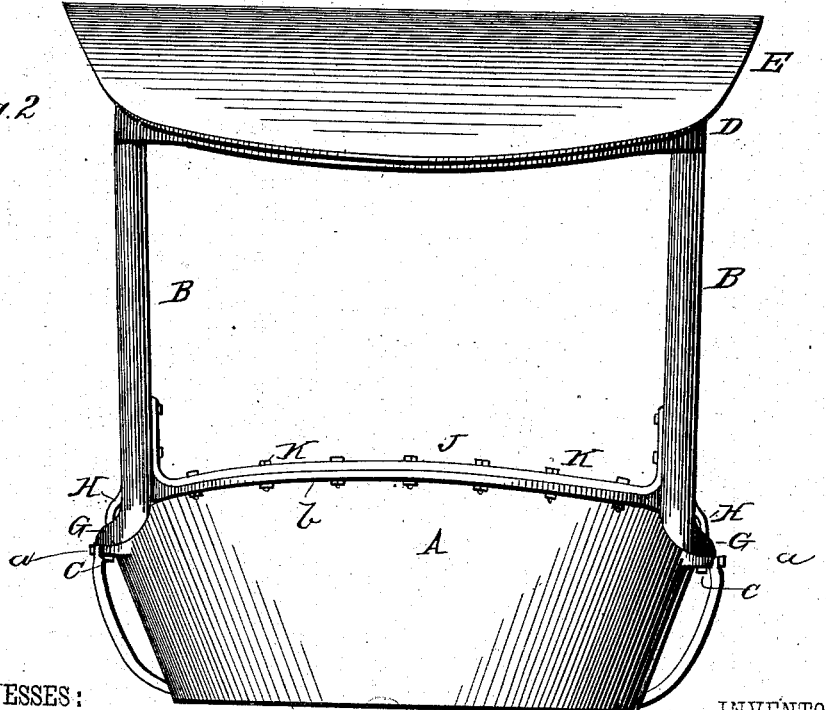

Figure 1 is a side view of my improved vehicle-top, and Fig. 2 is a rear view of the same.

Similar letters of reference indicate corresponding parts in both the figures.

My invention has relation to vehicle-tops; and it consists in the improved construction and combination of parts of the same, as hereinafter more fully described and claimed.

In the accompanying drawings, the letter A indicates the seat of a vehicle of any desired construction. The upper edges of the sides and back of the seat are provided with outward-turned flanges $a$ and $b$, and the forward-bent lower parts, G, of two uprights, B, are removably secured to the flanges $a$ on the sides of the seat by means of nutted bolts C. The upper ends of the standards B are curved slightly forward, and the top-frame D is fastened thereupon, which frame may be of any desired shape, but is preferably bent slightly down in front, to protect the persons in the seat from the sun and the weather. A cover, E, of canvas, leather, oil-cloth, or any other suitable material, is spread over the frame and fastened to it, as also curtains may be fastened by any suitable means to the edges of the frame for further protection. To further support and brace the top, metallic brace-rods F are fastened to the seat or the forward-bent arms G of the standards from where they are curved to form arm-supports H and bent upward, being connected to the uprights by clips I. From these clips the rods are again bent forward and fastened to the frame some distance in front of the standards. In this manner the brace-rods support the front part of the top and obviate the necessity of having uprights in front of the carriage. A bar, J, is bolted to both uprights over the top edge of the back of the seat, which unites the uprights and is removably fastened upon the flange $b$ of the back by screw-bolts K.

Having thus described my invention, I claim and desire to secure by Letters Patent of the United States—

1. The removable vehicle-top constructed with uprights B, having forward-bent lower parts, G, adapted to be secured to the side flanges, $a$, of the seat by bolts C, brace-bars F, secured at their lower ends to the front ends of parts G of the uprights, and at the other end to the top-frame in front of uprights B, and bent to form arm-supports H and braces for the top, and connecting-bar J, secured to the back flange, $b$, by means of nutted bolts K, as and for the purpose shown and set forth.

2. The combination of the vehicle-seat A, having side flanges, $a$, and back flange, $b$, with the removable top consisting of top D E, uprights B, having forward-bent lower parts, G, braces F H, and connecting-bar J, and adapted to be removably secured upon the seat-flanges $a\ b$ by bolts C and K, as and for the purpose shown and set forth.

In testimony that I claim the foregoing as my own I have hereunto affixed my signature in presence of two witnesses.

EDWARD WARREN.

Witnesses:
EDWIN W. KNEPPER,
EDWARD E. ABDILL.